Sept. 8, 1931. R. L. BROWN 1,822,335
OPERATING MECHANISM FOR CLUTCHES
Original Filed July 8, 1927
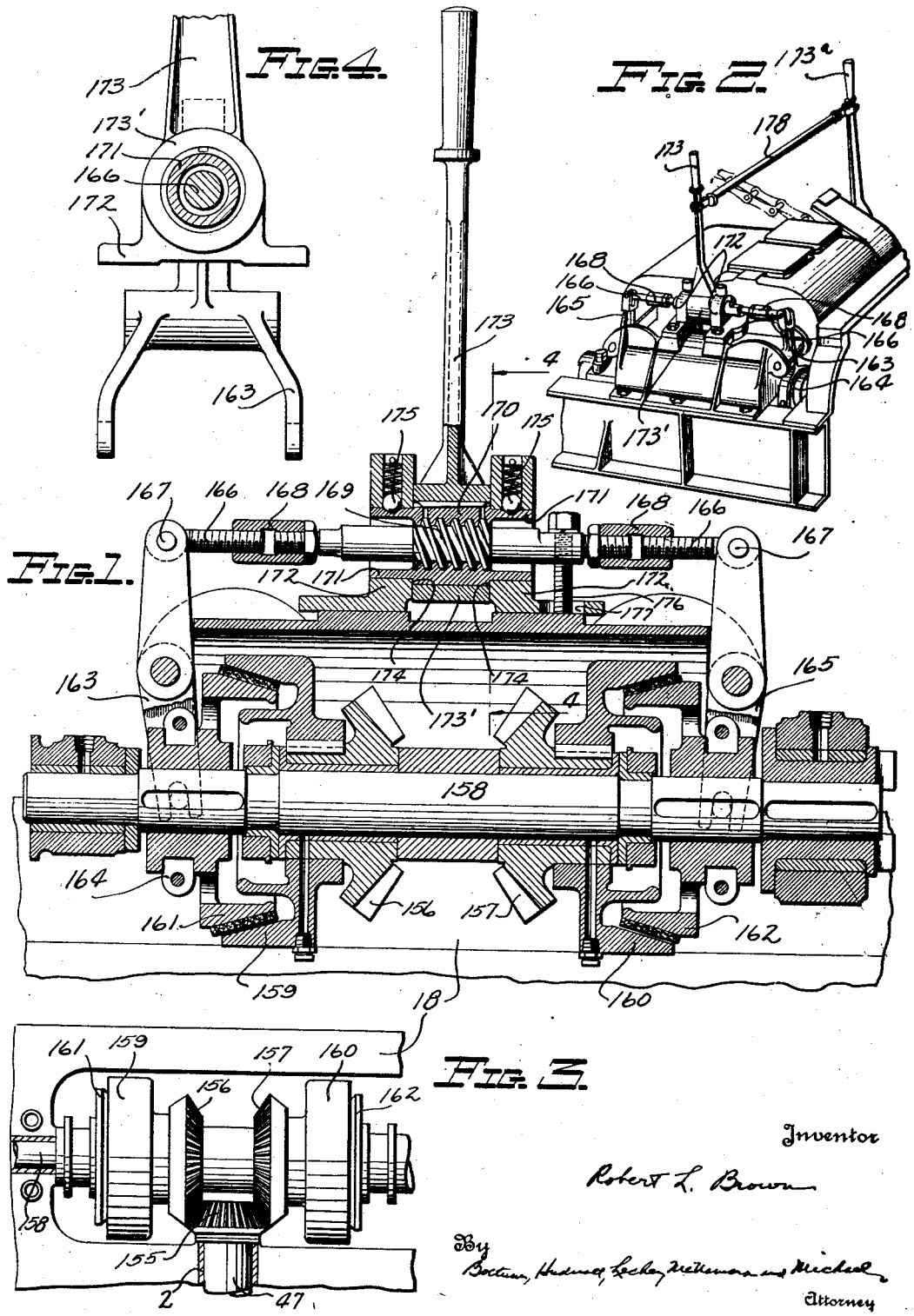

Patented Sept. 8, 1931

1,822,335

UNITED STATES PATENT OFFICE

ROBERT L. BROWN, OF MILWAUKEE, WISCONSIN, ASSIGNOR TO HARNISCHFEGER CORPORATION, OF MILWAUKEE, WISCONSIN, A CORPORATION OF WISCONSIN

OPERATING MECHANISM FOR CLUTCHES

Original application filed July 8, 1927, Serial No. 204,225. Divided and this application filed May 9, 1929. Serial No. 361,566.

This invention relates to operating or control mechanism for clutches and is particularly designed and adapted for use in operating the clutches of a reversing mechanism. The present application is a division of the copending application of Robert L. Brown for trenching machinery, filed July 8, 1927, Serial No. 204,225.

One of the principal objects of the present invention is to provide an operating or control mechanism of this character wherein a single movement of a control lever in one direction will engage one of the clutches and release the other and an opposite movement of the control lever will reversely operate the clutches.

Another object of the invention is to provide a control or operating mechanism having these advantages and capacities and which is of simple, durable and compact construction, reliable and effective in operation and easy and comparatively inexpensive to manufacture.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 is a view partly in central vertical section and partly in side elevation showing a reversing clutch arrangement equipped with a control or operating mechanism embodying the present invention;

Figure 2 is a fragmentary perspective view showing the control mechanism embodied in a trencher;

Figure 3 is a fragmentary plan view of the reversing clutch arrangement; and

Figure 4 is a sectional view taken on line 4—4 of Figure 1, with the clutches and other parts omitted for the sake of illustration.

Referring to the drawings, wherein, for the sake of illustration, is shown one embodiment of the invention, numeral 18 designates a casing having a bearing 2 supporting a drive shaft 47 driven in any suitable manner from a suitable source of power. At one end the drive shaft 47 is provided with a beveled pinion 155 which constantly meshes with a pair of oppositely disposed beveled gears designated at 156 and 157 (see Figures 1 and 3). The beveled gears 156 and 157 are loosely mounted on a shaft 158 journaled in bearings provided therefor in the main section 18 of the casing and these beveled gears have mounted thereon and fixed thereto conical clutch members 159 and 160. Shiftable clutch members 161 and 162 are splined on the shaft 158 and coact with the clutch members 159 and 160, respectively. These clutch members are alternately engaged, that is, the clutch members 159 and 161 are engaged in one adjustment and the clutch members 160 and 162 engaged in the other adjustment, and vice versa.

The operating mechanism for the clutch members 159 and 161 comprises a shifting fork 163 cooperable with the trunnions of a loose band 164 made up of sections suitably secured together and mounted in an annular groove in the hub of the clutch member 161 and a similar shifting fork 165 is similarly associated with clutch member 162 for controlling its coaction with clutch member 160. A rod 166 is provided and has its ends pivotally connected to the shifting forks 163 and 165 as at 167. Turn buckles 168 are incorporated in the rod to provide for adjustment of the shifting forks.

The central portion of the rod 166 is formed with a screw 169 threadedly engaged with a nut 170 having cylindrical extensions 171 rotatably fitted in bearing brackets 172 provided therefor and fixed to the casing. A hand lever or control lever 173 has a sleeve-like end 173′ embracing and securely fixed to the nut 170 in between the bearing brackets 172. The nut 170 is shouldered as at 174 adjacent its extensions 171 and these shoulders 174 engage the bearing brackets 172 to prevent axial movement of the nut while leaving it free to rotate.

Spring projected balls or detents 175 are provided on the bearing brackets 172 and engage recesses on the extensions 171 of the nut to releasably hold the nut in neutral position.

A guide stud 176 is threaded through the rod 166 and has its lower end slidably fitted in a guide slot 177 formed in the base of one of the bearing brackets 172 whereby the rod 166 is constrained to rectilinear movement.

With this arrangement when the hand lever 173 is swung in one direction the clutch members 159 and 161 are engaged and the clutch members 160 and 162 are disengaged. A reverse movement of the lever 173 reversely actuates the clutches. The control lever 173 is connected by a cross bar 178 with a duplicate control lever 173$^a$ provided on the opposite side of the machine to afford convenient control of these clutches from either side.

All that is required to manipulate the clutches is a simple pulling or pushing of the control lever and yet in either event one clutch is thrown in while the other is thrown out. A direct and powerful operating thrust is applied to the movable clutch members and yet little effort is required of the operator to effect appropriate manipulation of the control lever 173.

The invention claimed is:

1. Operating mechanism for a pair of clutches enclosed in a casing and comprising a pair of shifters adapted to be operatively connected with the clutches and projecting exteriorly of the casing, a rod connected to the projecting portions of the shifters and held against rotary movement while free to move bodily to impart operative movement to the shifters, a screw fixed to the rod, a pair of bearing brackets fixed to the casing and having openings through which the rod extends, a nut meshed with the screw of the rod and having extensions journaled in the openings of the brackets, cooperating means between the nut and the brackets for preventing axial movement of the nut while leaving it free to rotate and a hand lever connected to the nut and operable to rotate the same.

2. Operating mechanism for a pair of clutches enclosed in a casing and comprising a pair of shifters adapted to be operatively connected with the clutches and projecting exteriorly of the casing, a rod connected to the projecting portions of the shifters and held against rotary movement while free to move bodily to impart operative movement to the shifters, a screw fixed to the rod, a pair of bearing brackets fixed to the casing and having openings through which the rod extends, a nut meshed with the screw of the rod and having extensions journaled in the openings of the brackets, cooperating means between the nut and the brackets for preventing axial movement of the nut while leaving it free to rotate, a hand lever connected to the nut and operable to rotate the same, and means carried by the brackets and coacting with the nut extensions for releasably securing the nut in an angular position.

3. Operating mechanism for a pair of clutches enclosed in a casing and comprising a pair of shifters adapted to be operatively connected with the clutches and projecting exteriorly of the casing, a rod connected to the projecting portions of the shifters and held against rotary movement while free to move bodily to impart operative movement to the shifters, a screw fixed to the rod, a pair of fixed bearings having openings through which the rod extends, a nut meshed with the screw of the rod and having extensions journaled in the fixed bearings, means for preventing axial movement of the nut while leaving it free to rotate, and a hand lever connected to the nut and operable to rotate, the same.

4. Operating mechanism for a pair of clutches comprising a shifter for each clutch, a rod connected to the shifters and held against rotary movement while free to move bodily to impart operative movement to the shifters, a screw fixed to the rod, a nut meshed with the screw, means for preventing axial movement of the nut while leaving it free to rotate, and a single hand lever connected to the nut and operable to rotate the same.

In witness whereof, I hereto affix my signature.

ROBERT L. BROWN.